March 25, 1941. J. G. EICKHOFF 2,236,399
DRILL GUIDE
Filed Aug. 16, 1939 2 Sheets-Sheet 2
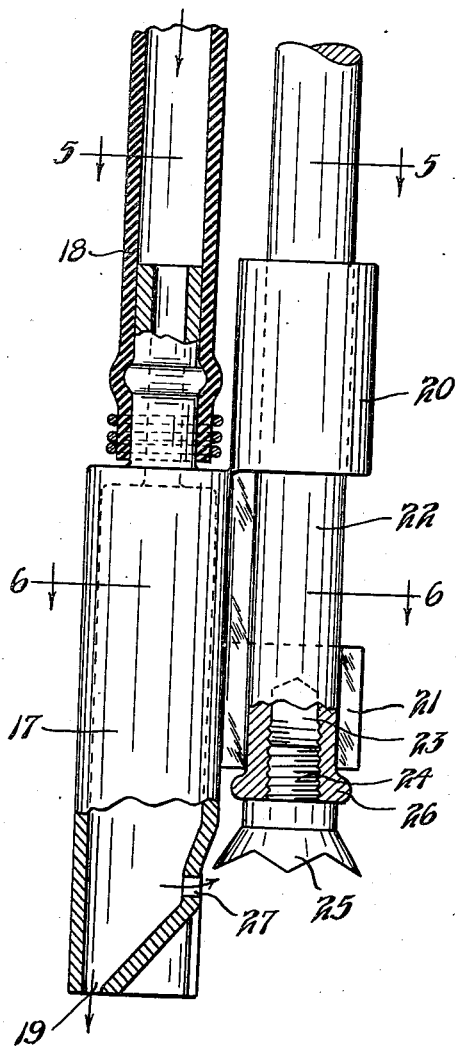
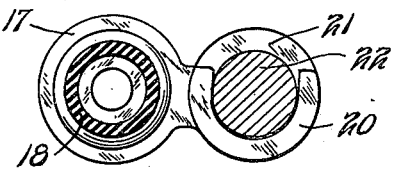
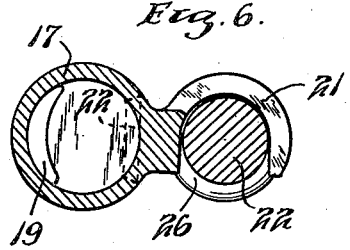
INVENTOR.
JOHN G. EICKHOFF.
BY HIS ATTORNEYS
Williamson & Williamson Patented Mar. 25, 1941

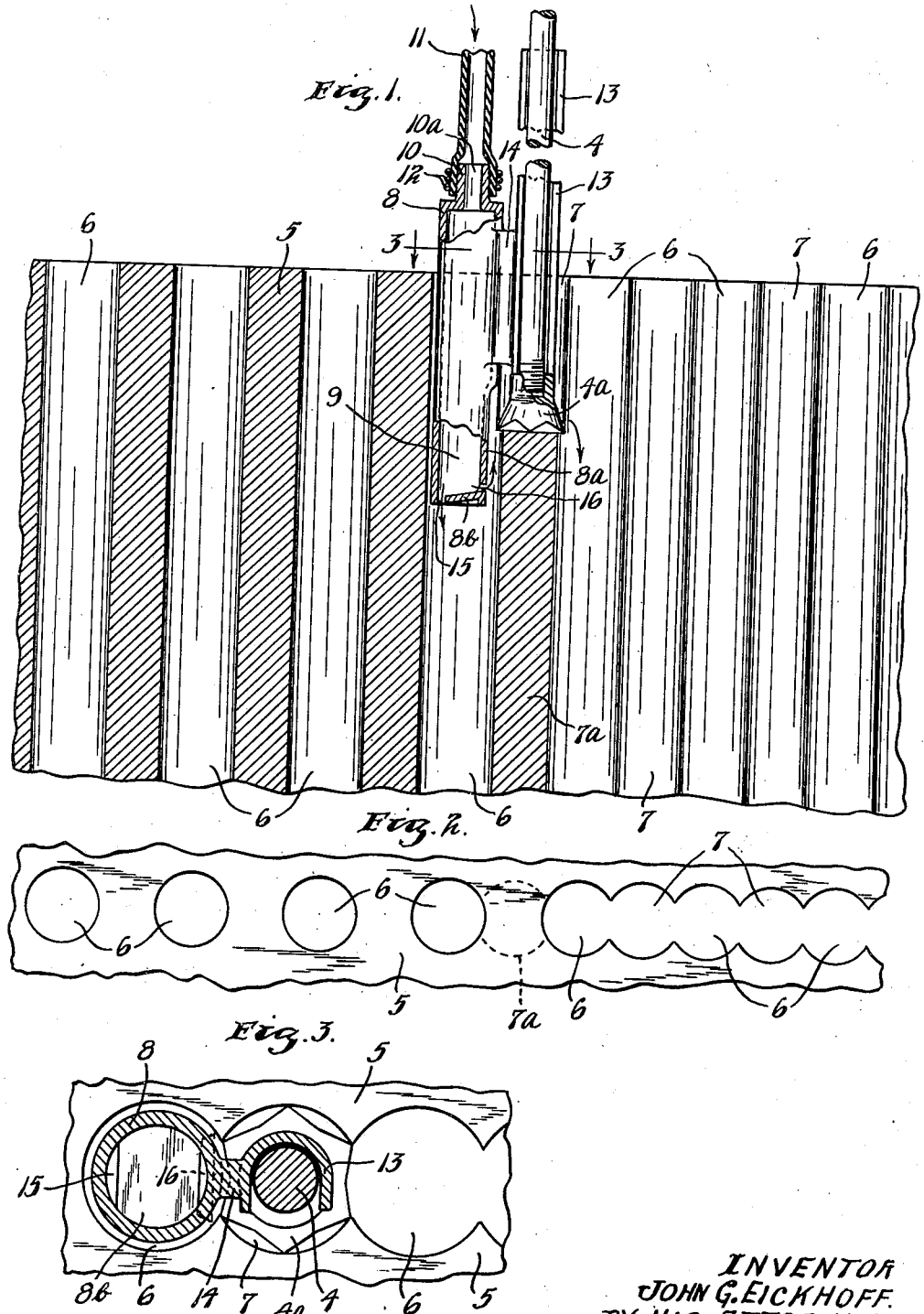

2,236,399

UNITED STATES PATENT OFFICE 2,236,399

DRILL GUIDE

John G. Eickhoff, Cold Spring, Minn., assignor to Cold Spring Granite Company, Cold Spring, Minn., a corporation of Minnesota Application August 16, 1939, Serial No. 290,390

8 Claims. (Cl. 255—61)

My invention relates to rock drills and particularly to guides therefor to be used in interlapping or broach drilling.

In quarrying operations it is common practice to cut blocks of rock from the main body thereof by drilling series of spaced parallel bores in the rock and then drilling additional bores between the interlapping into the bores of said series. In drilling the above mentioned additional bores, difficulty is frequently encountered due to the drill working toward and into a bore of the original series instead of following a line parallel to and midway between two bores of the original series. Also, accumulation of dust and granular products of a drilling operation in a bore being drilled tends to interfere with the drilling operation.

An object of my invention is to provide a device capable of use to effectively and relatively accurately guide a drill in drilling of parallel interlapping bores.

Another object is to provide such a device constructed to enable a drill to be quickly and easily placed in or removed from operative relation therewith.

Still another object is to provide such a device having incorporated therein means for conveying and directing fluid under pressure in such a manner as to effect removal of dust and particles of material from a bore which is being drilled.

A further object is to provide such a device of simple, light, compact, rugged and inexpensive construction.

These and other objects and advantages of my invention will more fully appear from the following description made in connection with the accompanying drawings, wherein like reference characters refer to the same parts throughout the views, and in which:

Fig. 1 is a partially broken away, partially sectional side view of an embodiment of my invention shown in association with a drill and a body of material on which drilling operations are being performed;

Fig. 2 is a top view of the mass of material of Fig. 1;

Fig. 3 is a sectional view taken on the line 3—3 of Fig. 1 as indicated by the arrows and drawn to enlarged scale;

Fig. 4 is a view partly in side elevation and partly in vertical section of another embodiment of my invention;

Fig. 5 is a section taken approximately on the line 5—5 of Fig. 4; and

Fig. 6 is a section taken approximately on the line 6—6 of Fig. 4.

Referring to the drawings an embodiment of my invention is shown associated with a drill of conventional form having a shank 4 on which an enlarged cutting head 4a is removably mounted as, for example, by means of screw threads. The combination of my device and the drill are shown in operative relation with a mass 5 of material such as rock.

In quarrying operations it is customary in making a cut in a body of rock to first drill a series of holes or bores 6 which are disposed parallel to each other and are spaced apart by a suitable distance. After this original series of holes has been drilled, other holes 7 are drilled between the holes of the original series in interlapping relation therewith so that the holes 6 and 7 are all in communication with each other and constitute a cut in the mass 5 of material. In drilling the holes 7 of the second series thereof the drill 4 is operated to remove a body of material such as that indicated by dotted lines at 7a. In drilling out the body of material 7a the drill has a tendency to be displaced sidewardly into one or the other immediately adjacent holes or bores 6 of the original series. It is this displacement of the drill which my device is designed to prevent.

My device includes an elongated body 8 preferably of generally cylindrical shape adapted to slide longitudinally in one of the bores 6 of the original series thereof. The member 8 is provided with an interior space or passage 9 adapted for transmitting a fluid such as air or water. At its upper end the member 8 is provided with an upwardly extending neck 10 which is vertically apertured to form an inlet port 10a for fluid under pressure. A flexible conduit 11 may be telescoped on to the inlet neck 10 and may be secured thereon by suitable means such as wire bands 12 tightly encircling the exterior of the portion of the conduit 11 located on the neck 10.

Means for guiding a drill is carried by the member 8. This means may and preferably does consist of a U-shaped guide 13 disposed parallel to the upper end of the member 8 and extending upwardly above the upper end of the member 8. The U-shaped guide 13 is so positioned that the open side thereof faces in a direction normal to a vertical plane containing the longitudinal axes of the member 8 and the guide 13. The guide 13 has internal dimensions such that the shank 4 of a drill to be used with the guide will be closely but slidably contained in the interior space of the guide 13. The guide 13 is rigidly connected with the member 8 by means of a vertically disposed element 14 extending between the member 8 and the guide 13 and preferably formed integrally therewith. The distance between the axes of the member 8 and the guide 13 is such that the axis of a drill shank 4 will be equi-distant between the axes of the two adjacent bores 6 of the previously described original series of bores when the member 8 is disposed in one bore of said pair.

The lower portion of the member 8 is cut away or flattened at the side thereof nearest the guide 13 at 8a to provide clearance between the member 8 and the enlarged head 4a of a drill. This cutting away or flattening of the member 8 also provides a fluid passage between the lower portion of the member 8 and the body 7a of material to be removed.

The lower end of the member 8 includes a bottom wall 8b which preferably slopes upwardly toward the right as viewed in the drawings. A fluid outlet port 15 is formed in the left-hand portion of the bottom wall or closure 8b of the member 8. Another fluid outlet port 16 is formed in the peripheral wall of the member 8 in the flattened portion 8a thereof and immediately above the bottom wall or closure 8b.

The fluid outlet ports 15 and 16, the passage 9, and the fluid inlet port 10a constitute means for handling a fluid in such a manner as to blow or flush away particles and chips of material removed from the body of material 7a by the enlarged cutting head 4a of a drill.

In operation of the device, the device and a drill 4 are associated with a mass of material 5 as shown in Fig. 1, the mass of material 5 previously having had the original series of spaced bores 6 drilled therein. Obviously the drill shank 4 is free to move vertically in the guide 13 but cannot move relative thereto in a direction either toward or away from the bores 6 disposed at respective sides of the body of material 7a on which the drill is working. As the drill progresses downwardly the member 8 may also be shifted downwardly. It also should be apparent that the drill shank 4 may be readily placed in or removed from the guide 13 by sideward movement relative thereto when the drill 4 and my device are not in association with a mass of material such as the mass 5.

A source of fluid under pressure is connected by means of the conduit 11 to the fluid inlet port 10a of the member 8. This fluid will fill the interior of the member 8 and will be expelled out of the member 8 through the fluid outlet ports 15 and 16. Fluid coming out of the lower fluid outlet port will fill the interior of the bore 6 below the member 8 and being under pressure will flow upwardly through the passage between the flattened portion 8a of the member 8 and the body of material 7a on which the drill is working. Fluid issuing from the right-hand fluid outlet port 16 is deflected and carried upwardly along with fluid which has issued from the port 15 as previously described. This fluid from port 16 is directed against the rock immediately below the cutting head to keep it cool. The fluid will rise and will pass to the right past the enlarged cutting head 4a of the drill to cool the same and to carry the dislodged grains and chips of material into the bores 6 and 7 to the right of the drill. Thus the drill will be kept clear of cuttings which would interfere with the operating efficiency of the drill, and the maintenance of lower temperatures will greatly lengthen the effective life of the cutting head. If the fluid used is air, the dislodged material will be blown away and if the fluid used is water, the material will be flushed away from the cutting head 4a. From the standpoint of eliminating dust at the scene of the drilling operation use of water is preferable to use of air, but it is sometimes necessary to use air under pressure where the atmospheric temperature goes considerably below freezing. In extremely cold weather, water would freeze in the bores and completely halt the drilling operation.

Figs. 4, 5 and 6 illustrate another embodiment of my invention which is greatly preferred in some respects to that structure shown in Figs. 1 through 3. A cylindrical drill body 17 is provided. It is generally similar to the cylindrical body 8 in the other form of the invention. It is hollow and has suitably secured to its upper inlet a rubber hose 18 for conducting fluid to the interior of said body. The lower end of the body 17 is provided with a downwardly opening port 19 and, as shown in Fig. 4, the right-hand lower portion of the body 17 is slanted to provide clearance between said body and the wall of a bore in which it is inserted. The body 17 is also flattened, as clearly shown in Fig. 4, similarly to the flattened portion 8a of the body 8 in the other embodiment.

Extending laterally from the body 17 is an upper U-shaped element 20 and a lower U-shaped element 21. These two elements are in spaced relation to each other and are formed on arcs of circles on a common vertical axis. The spacing between the U-shaped elements 20 and 21 is preferably somewhat greater than the diameter of the shank of any type of drilling tool, and as shown, the upper U-shaped element 20 is open at one side while the lower element 21 is open at the opposite side.

The drill tool shank 22 is adapted to lie in the U-shaped elements 20 and 21, as shown, and it is inserted by tilting it to an angle approximating the horizontal, placing it in the space between the two U-shaped elements, and then tilting it to a vertical position so that the bottom of the shank fits into the lower element 21 and a more upwardly disposed portion of the shank fits into the upper U-shaped element 20. The shank 22 is provided with an internally threaded aperture 23 which is adapted to receive the external threaded portion 24 of a drilling head or bit 25. The lower end of shank 22 is enlarged as at 26 and the lower U-shaped shank-engaging element 21 is adapted to rest upon said enlargement 26. In the foregoing embodiment of the invention the U-shaped element 13 rests upon the upper shoulder of the drilling head or bit 4a. This causes frictional wear on the drilling head which is eliminated by the enlarged lower end 26 of the shank 22, shown in Fig. 4.

A fluid outlet opening 27 is provided adjacent the lower end of the cylindrical guide body 17, said opening being positioned in the side wall of the body immediately adjacent the teeth on the drilling head 25. Thus water or air is directed through the opening 27 directly to the teeth so that the teeth themselves are cooled, whereas in the preceding embodiment of the invention fluid was directed from the opening 16 against rock or stone about to be cut by the drilling head 4a.

This embodiment of the invention it will be seen provides a drill guide for cutting rock and stone wherein the drill itself is held positively against movement into an adjacent previously cut bore, and the opposed arrangement of the U-shaped elements 20 and 21, while permitting quick and simple application of a drill shank thereto, securely positions the shank against radial or lateral movement in any direction, making it impossible for the drill to creep away from its proposed line of cut. The outlet opening 27 is advantageously placed to direct liquid for cooling and for washing away stone dust immediately adjacent the cutter and the guide structure under no circumstances can come into frictional or other contact with the drilling head 25.

It is apparent that I have invented a novel, compact, simple and inexpensive device for guiding a drill in drilling parallel interlapping bores and also clearing away material dislodged by the drill.

It will, of course, be understood that various changes may be made in the form, proportions and arrangements of the various parts without departing from the scope of my invention.

What is claimed is:

1. A device for guiding a drill having a shank-equipped enlarged cutting head in drilling parallel interlapping bores comprising, a cylindrical member adapted to slide longitudinally in a completed bore, a drill shank guide disposed parallel to the upper portion of said member, and means rigidly interconnecting said member and said guide, the respective axes of said member being so spaced that a bore drilled by a drill guided by said guide will interlap a bore containing said member, said member being cut away in portions for clearance from said cutter head, said member being hollow and having a closure and an inlet for fluid under pressure at its respective lower and upper ends, the peripheral wall of said member having a fluid outlet port therethrough adjacent the lower end thereof at the side thereof nearest said guide and said closure having a fluid outlet port therethrough diametrically opposite said first mentioned port.

2. A device for guiding a drill having a shank-equipped enlarged cutting head in drilling parallel interlapping bores comprising, a cylindrical member adapted to slide longitudinally in a completed bore, an elongated drill shank guide of U-shaped cross section disposed parallel to the upper portion of said member with the open side of said guide facing normal to a plane containing the respective longitudinal axes of said member and said guide, and means rigidly interconnecting said member and said guide, said axes being so spaced that a bore drilled by a drill guided by said guide will interlap a bore containing said member, the side of the lower end of said member nearest said guide being suitably cut away to provide clearance between said member and said cutter head, said member being hollow and having a closure and an inlet for fluid under pressure at its respective lower and upper ends, the peripheral wall of said member having a fluid outlet port therethrough adjacent the lower end thereof at the side thereof nearest said guide and said closure having a fluid outlet port therethrough diametrically opposite said first mentioned port.

3. A device for guiding a drill having a shank-equipped cutting head in drilling parallel bores comprising, a generally cylindrical member adapted to slide longitudinally in a completed bore, an upper drill shank guide of substantially U-shaped cross section supported by said cylindrical member and disposed parallel to said member with the open side of said guide element facing in one direction normal to a plane containing the respective longitudinal axes of said member and said guide, and a second drill shank guide of substantially U-shape in cross section also supported by said cylindrical member, said second guide facing in a direction substantially opposite to the facing of said first mentioned guide.

4. The combination with a drill having an elongated shank and a cutting head carried at its lower end, of a member adapted to slide longitudinally in a completed bore, means for supplying fluid to said member, the lower end of said member having a downwardly opening fluid outlet, and the side wall portion of said member having a second fluid outlet, a drill shank guide engageable with said shank and lying substantially parallel to said longitudinally slidable member, the opening in the side wall of said latter member being positioned closely adjacent said cutting head and approximately at the same level therewith.

5. In combination with a source of fluid under pressure and a drill having a shank and an enlarged cutting head, a broach drilling attachment comprising, a generally cylindrical member adapted to slide longitudinally in a completed bore, a drill shank guide disposed parallel to said member and connected therewith, said guide and member being supported from an enlargement adjacent the lower end of said drill, said member having a fluid passage therethrough, means for connecting the upper end of said passage with said source of fluid under pressure, and said member having a fluid discharge in the lower portion thereof.

6. In combination with a source of fluid under pressure and a drill having a shank and a cutting head, a broach drilling attachment comprising, a generally cylindrical member adapted to slide longitudinally in a completed bore, a drill shank guide disposed parallel to said member and rigidly connected thereto, said member extending ly connected thereto, said member extending some distance below the lower edge of said guide and below the cutting head of a drill embraced by said guide, said member having a fluid passage therein, means for connecting the upper end of said passage with said source of fluid under pressure, and said member having a fluid discharge in the lower portion thereof.

7. In combination with a source of fluid under pressure and a drill having a shank and an enlarged cutting head, a broach drilling attachment comprising, a generally cylindrical member adapted to slide longitudinally in a completed bore, a drill shank guide disposed parallel to said member and rigidly connected thereto, said member extending some distance below the lower edge of said guide and below the cutting head of a drill embraced by said guide, said member having a fluid passage therein, means for connecting the upper end of said passage with said source of fluid under pressure, said member having a fluid discharge in the lower portion thereof, and said member having an external and longitudinally extending recess below said shank guide, said recessed portion cooperating with a completed bore to define a passage for fluid and ground material.

8. In combination with a source of fluid under pressure and a drill having a shank and a cutting head, a broach drilling attachment comprising, a generally cylindrical member adapted to slide longitudinally in a completed bore, a drill shank guide disposed parallel to said member and rigidly connected thereto, said member defining a fluid passage extending from the upper portion thereof to the lower portion thereof, means for connecting the upper end of said passage with a source of fluid under pressure, and said member having a downwardly directed fluid discharge communicating with said passage in the lower portion thereof and also having a laterally extending fluid discharge communicating with said passage and disposed adjacent the lower end of said passage and at the side of said member nearest said drill shank guide.

JOHN G. EICKHOFF.